United States Patent
Ahluwalia et al.

(10) Patent No.: US 7,322,026 B2
(45) Date of Patent: Jan. 22, 2008

(54) SCORING ASSERTIONS

(75) Inventors: Manish K. Ahluwalia, Santa Clara, CA (US); Eric W. Hamilton, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/792,208

(22) Filed: Mar. 2, 2004

(65) Prior Publication Data

US 2005/0198622 A1    Sep. 8, 2005

(51) Int. Cl.
    *G06F 9/44*    (2006.01)
(52) U.S. Cl. ..................................... 717/124
(58) Field of Classification Search ............ 717/124; 714/36
    See application file for complete search history.

(56) References Cited

U.S. PATENT DOCUMENTS

| | | | | |
|---|---|---|---|---|
| 6,085,029 A | * | 7/2000 | Kolawa et al. | 714/38 |
| 6,138,252 A | * | 10/2000 | Whitten et al. | 714/46 |
| 6,658,598 B1 | * | 12/2003 | Sullivan | 714/25 |
| 6,820,251 B1 | * | 11/2004 | Dwyer | 717/130 |
| 7,168,009 B2 | * | 1/2007 | Darringer et al. | 714/38 |
| 2005/0055605 A1 | * | 3/2005 | Blumenthal et al. | 714/13 |
| 2005/0204345 A1 | * | 9/2005 | Rivera et al. | 717/127 |

* cited by examiner

*Primary Examiner*—Wei Zhen
*Assistant Examiner*—Philip Wang (57) ABSTRACT

Systems, methods, and devices are provided for scoring assertions in software testing. One method embodiment includes registering assertions which fail during testing of software code. The method includes analyzing failed assertions against a set of questions. The failed assertions are scored based on analyzing the failed assertions against a set of questions.

37 Claims, 6 Drawing Sheets

SCORING ASSERTIONS

BACKGROUND

In software development, there can be many different groups of programmers working on different portions of software code that will later be compiled to create a finished program. A compiler is software that converts a set of high-level language statements (e.g., high level programming language such as C/C++, COBOL, etc.) into a lower-level representation. For example, compiler software translates a program written in a high-level programming language (C/C++, COBOL, etc.) into machine language. A compiler may generate assembly language first and then translate the assembly language into machine language. A utility known as a "linker" then combines all required machine language modules into an executable program that can run in the computer. A help compiler converts a text document embedded with appropriate commands into an online help system. A dictionary compiler converts terms and definitions into a dictionary lookup system.

Compiled programs are translated into the machine language of the target computer. Interpreted programs are either kept in their original source code or are precompiled into an intermediate form. In both cases, an interpreter is required to translate the program into machine language at runtime, whereas the compiled program is "ready to go." In software development an integrated development environment (IDE) may be used which includes a set of programs run from a single user interface. For example, an IDE often includes a text editor, compiler and debugger, which are all activated and function from a common menu.

As programs are developed they are tested under a workload, e.g., a system under test (SUT), to ensure that the programs will function as intended. Assertions are a technique used to detect errors in software. In the field of software development, assertions are purposefully placed in the source code as it is written. As programs are compiled or tested the assertions are checked to verify conditions always believed to be true. A run time test put in place by a developer will check to see if assertions have failed. In this manner assertions provide an early clue to potential problems in the code such that one can stop and debug early rather than later in an effort to avoid glitches in the code. Thus, assertions help catch bugs and detect invalid states of execution in a program. Assertions can include run time assertions, compile time assertions, as well as assertions associated with hardware and circuitry.

Test programs operating on a SUT or a compiler can create a list of assertions which fail for review by a developer of a particular portion of software code. Sometimes certain assertions are more useful than others in terms of providing insight as to what is being done wrong in developing software code. Current test programs do not analyze and correlate failed assertions with a type of assertion in the code under development. This task rests with the program developer. With different groups of programmers working on different portions of software code it can be cumbersome to communicate one programmer's code development findings to that of another programmer working on another portion of the software code.

DETAILED DESCRIPTION

Program instructions are provided which execute to collect a history of assertions which fail during run time testing. Assertions which fail are analyzed against a list of questions or rules (e.g., computer executable instructions). The instructions execute to correlate the correlate failed assertions with a type of assertion in the code under development. The instructions execute to score failed assertions based on frequency of occurrence. Over the entire lifecycle of testing a product, more useful assertions will score more points. In various embodiments, the assertions which fail are scored to learn what is occurring incorrectly in the coding process. The assertions which fail can also be scored to encourage software programmers, coders, to include useful assertions, e.g., those which frequently fail serving to catch glitches, bugs, or invalid states of execution in a program, in the coding process. The assertions which fail can also be scored to learn by observation how to write improved assertions.

Figure 1:
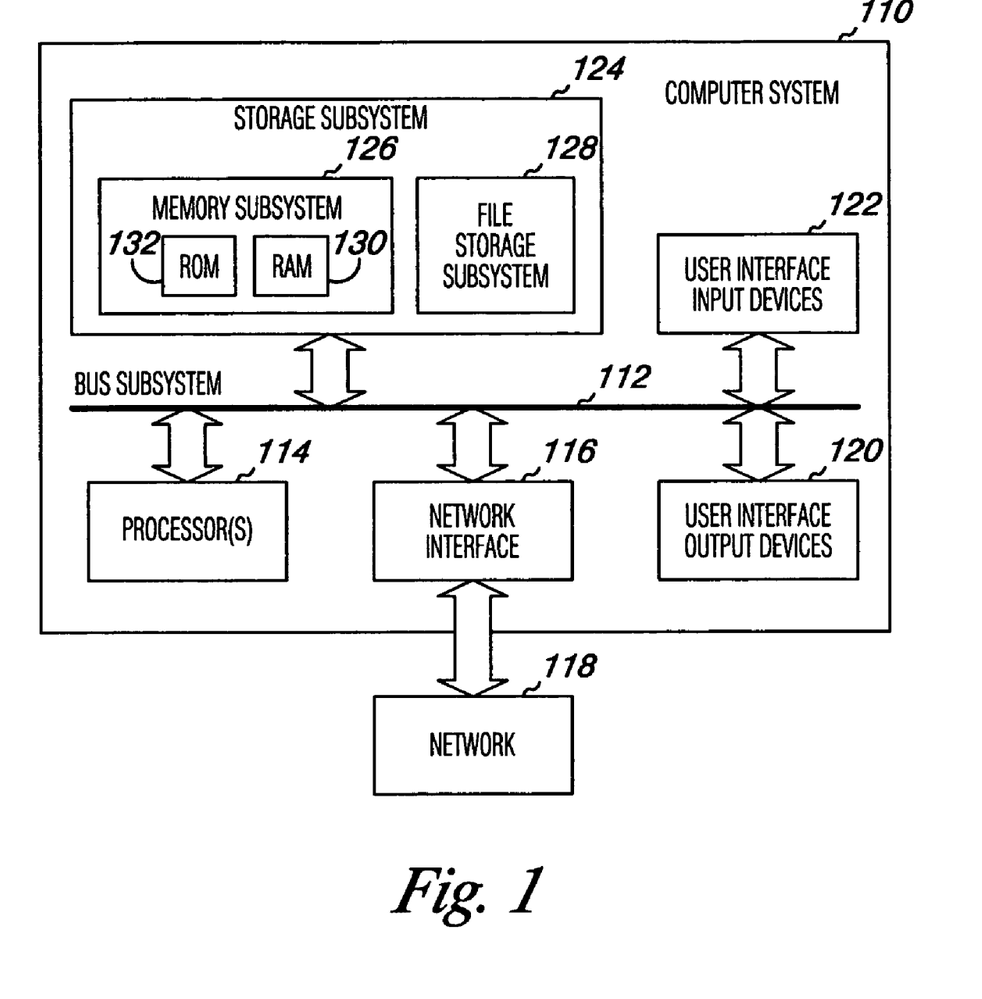
FIG. 1 is a block diagram of a computer system suitable to implement embodiments of the invention.

FIG. 1 is a block diagram of a computer system 110 suitable to implement embodiments of the invention. Computer system 110 includes at least one processor 114 which communicates with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. As will be understood upon reading this disclosure, network 118 can connect programs executing on the computer system 110 as part of a system under test, e.g., a particular software workload and hardware resource implementation, to a test harness, e.g., hardware such as a computing device test controller having a software testing program installed thereon, to test various software code. The communication links may be hardwire links, optical links, satellite or other wireless communications links, wave propagation links, or any other mechanisms for communication of information. Network 118 may be any suitable network 118.

For example, programs are written in software code (e.g. computer executable instructions) by programmers for execution on computing devices and across computing networks. Computing networks can include multiple computing devices such as servers, desktop PCs, laptops, and workstations, among other peripheral devices, e.g., printers, facsimile devices, and scanners, networked together across a local area network (LAN) and/or wide area network (WAN).

A LAN and/or WAN uses clients and servers that have network-enabled operating systems such as Windows, Mac, Linux, and Unix. An example of a client includes a user's workstation. The servers can hold programs and data that are shared by the clients in the computing network. Servers come in a wide range of capacities and costs from PC servers to mainframes. A printer, facsimile device, and/or scanner can be attached locally to a workstation or to a server and be shared by network users. A computing device having processor logic and memory includes an operating system layer and an application layer to enable the device to perform various functions or roles.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system layer and an application layer to enable the device to perform various functions or roles. The storage subsystem can further include program instructions for testing software in an integrated development environment. As described in more detail below, the program embodiments can be resident on a memory subsystem 126 of the storage subsystem 124 and executable by the processor 114 for scoring assertions, collecting a history of failed assertions, and correlating failed assertions with particular types of assertions in software code during testing of software code.

Memory subsystem 126 typically includes a number of memories including a main random access memory (RAM) 130 for storage of program instructions and data during program execution and a read only memory (ROM) 132 in which fixed instructions are stored. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. Program embodiments according to the present invention may also be stored by file storage subsystem 128 or elsewhere in a distributed computing environment as the same will be known and understood by one of ordinary skill in the art.

Bus subsystem 112 provides a mechanism for letting the various components and subsystems of computer system 110 communicate with each other as intended. Although bus subsystem 112 is shown schematically as a single bus, alternate embodiments of the bus subsystem 112 may utilize multiple busses.

Computer system 110 itself can be of varying types including a personal computer, a portable computer, a workstation, a computer terminal, a network computer, a mainframe, or any other data processing system or user device. As one of ordinary skill in the art will appreciate upon reading this disclosure, the computer system 110 illustrated in FIG. 1, can include programs executing thereon as part of a system under test (SUT), e.g., a particular software workload and hardware resource implementation, and be connected via network 118 to a test harness, a test ring, a test service station in a network test center, e.g., including hardware such as a computing device test controller having software testing programs installed thereon as the same will be known and understood by one of ordinary skill in the art (discussed in more detail in connection with FIGS. 3A and 3B), to test various software code. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

Figure 2:
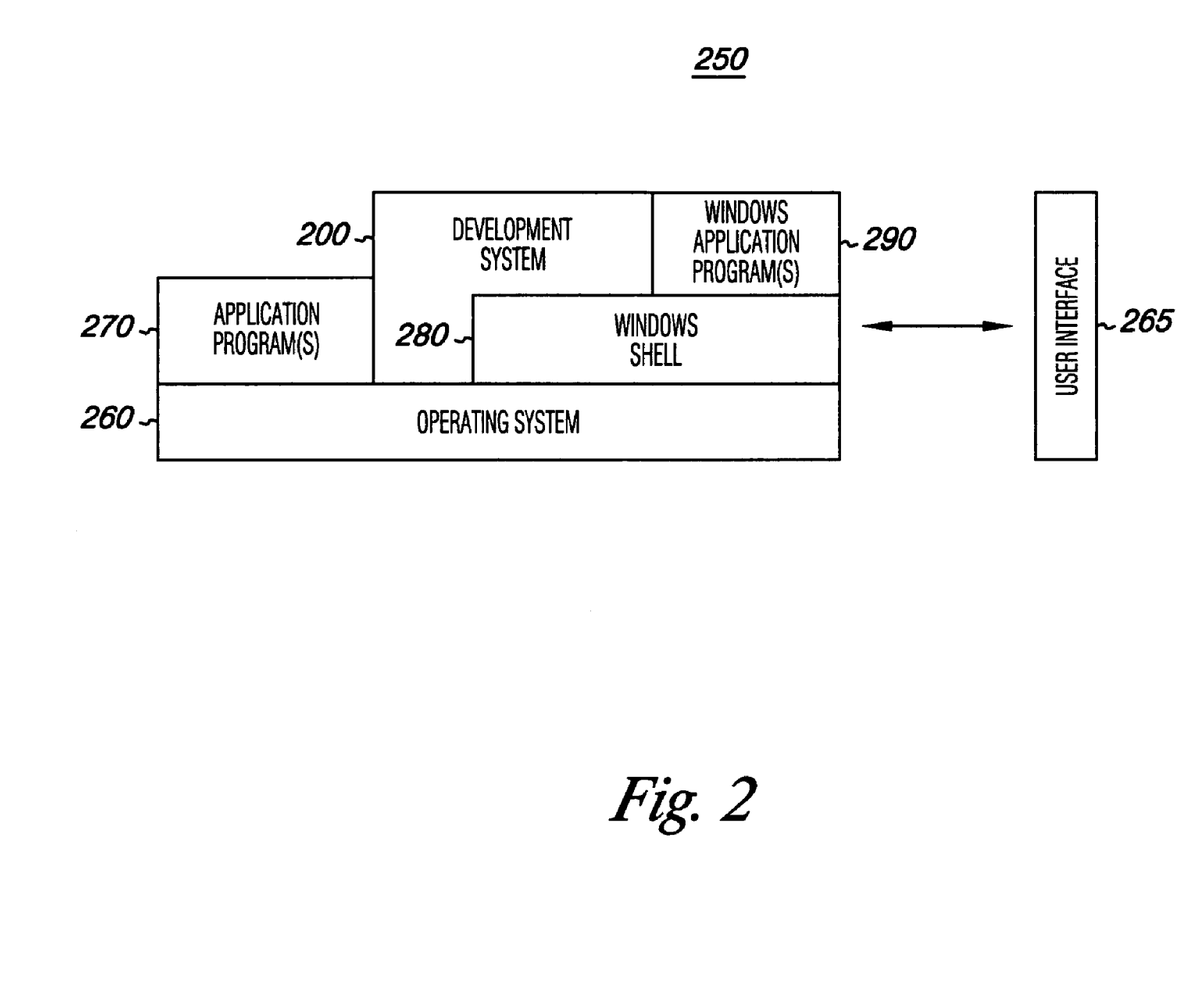
FIG. 2 is a block diagram embodiment of a software system including a program for scoring assertions which is executable on the computer system of FIG. 1.

FIG. 2 is a block diagram embodiment of a software system 250 including program instructions for testing software code and scoring failed assertions. As one of ordinary skill in the art will appreciate upon reading this disclosure, the software system embodiment shown in FIG. 2 is executable on the computer system 110 of FIG. 1 and is provided for programming the operation of the computer system 110 itself and/or another computing device included in the network 118, e.g., a test harness, a test ring, and/or test service station in a network test center as mentioned above. Software system 250, which can be stored in main memory, e.g., memory subsystem 126 and/or memory on the test harness, a test ring, and/or test service station in a network test center, includes a kernel or operating system layer 260 and a windows shell or interface 280. One or more application programs, such as application programs 270 or windows applications programs 290, may be "loaded" (i.e., transferred from file storage subsystem 128 into main memory 126) for execution by the computing system 110 shown in FIG. 1 and/or memory on the test harness, a test ring, and/or test service station in a network test center. That is, computing system 110 can be part of a system under test (SUT), e.g., a particular software workload and hardware resource implementation, and be connected via network 118 to a test harness, a test ring, a test service station in a network test center. Operating system 260 and shell 280, as well as application software 270 and 290, communicate with a user through an interface 265 for receiving commands and data and displaying results and other useful information.

As shown in the embodiment of FIG. 2, software system 250 includes program instructions, illustrated as development system 200, for testing software. According to embodiments described herein, the development system 200 includes program instructions which are executable to register which kinds of assertions fail in association with software code undergoing testing. The program instructions execute to analyze assertions which fail against a set of rules to determine a kind of assertion which repeatedly fails. The program instructions execute to collect a history of assertions which fail in association with the software code executing on a computing device. The program instructions execute to correlate failed assertions with particular types of assertions in software code during testing of software code. And, the program instructions execute to score the assertions which fail based on frequency of occurrence. In this manner, over the entire lifecycle of testing software code, more useful assertions will score more points. That is, the assertions which fail are scored to learn what is occurring incorrectly in the coding process and/or learn which assertions are routinely useful and even how to improve in implementing assertions.

According to various embodiments, the collected history of assertions which fail and their correlation to particular assertions in the software code undergoing testing can be generated as a report (e.g., identifying failed assertions by a type and/or kind of assertion in the software code) and can be transmitted to a developer of the software code. One of ordinary skill in the art will appreciate upon reading this disclosure that such reports can serve as a resource, e.g., systematic feedback, to the software developer for purposes of reusing assertions which repeatedly fail. That is, the assertions which repeatedly fail are routinely effective in indicating issues in the software code undergoing testing, serving to catch glitches, bugs, or invalid states of execution in a program in the coding process. Additionally, such systematic feedback can serve as a basis or reference point for the software developer to write improved assertions. As shown in the embodiment of FIG. 2, the development system 200 includes components which interface with a computing system, e.g., system 110 in FIG. 1 or on the test harness, a test ring, and/or test service station in a network test center, through a windows shell 280, as well as components which interface directly through the operating system 260.

By way of example, and not by way of limitation, the operating system 260 of the computing system, e.g., system 110 in FIG. 1, can include a Unix, Linux, Windows, and/or Mac operating system, among others. The software system 250, including the development system 200, can be written in any suitable programming language, e.g., C++, Pascal, COBOL, Java, etc., as appropriate for interacting with a variety of software applications, including word processing, database, spreadsheet, text editors, and the like.

Figure 3A:
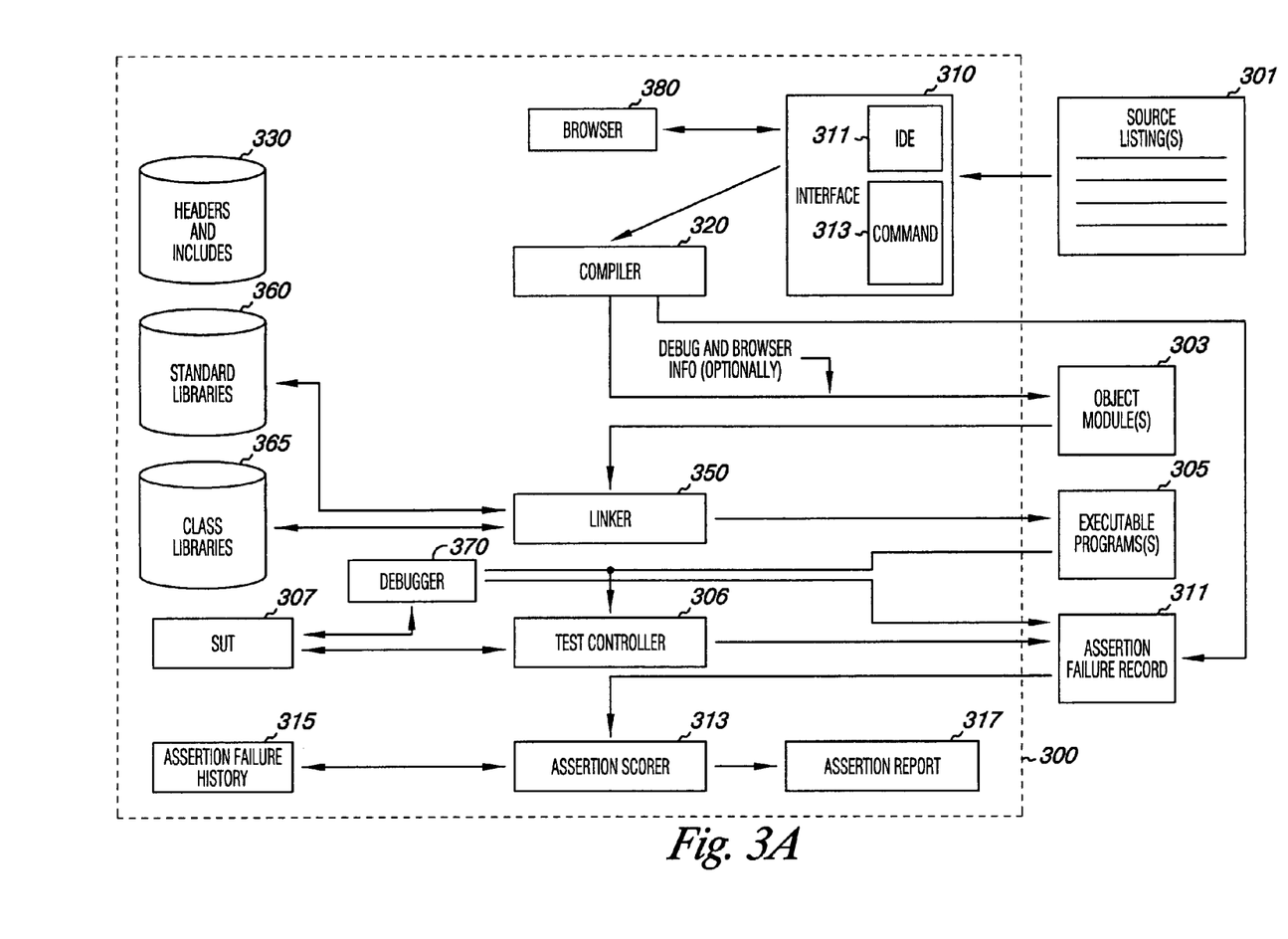
FIG. 3A is a block diagram of an embodiment of a development system shown in FIG. 2.
Figure 3B:
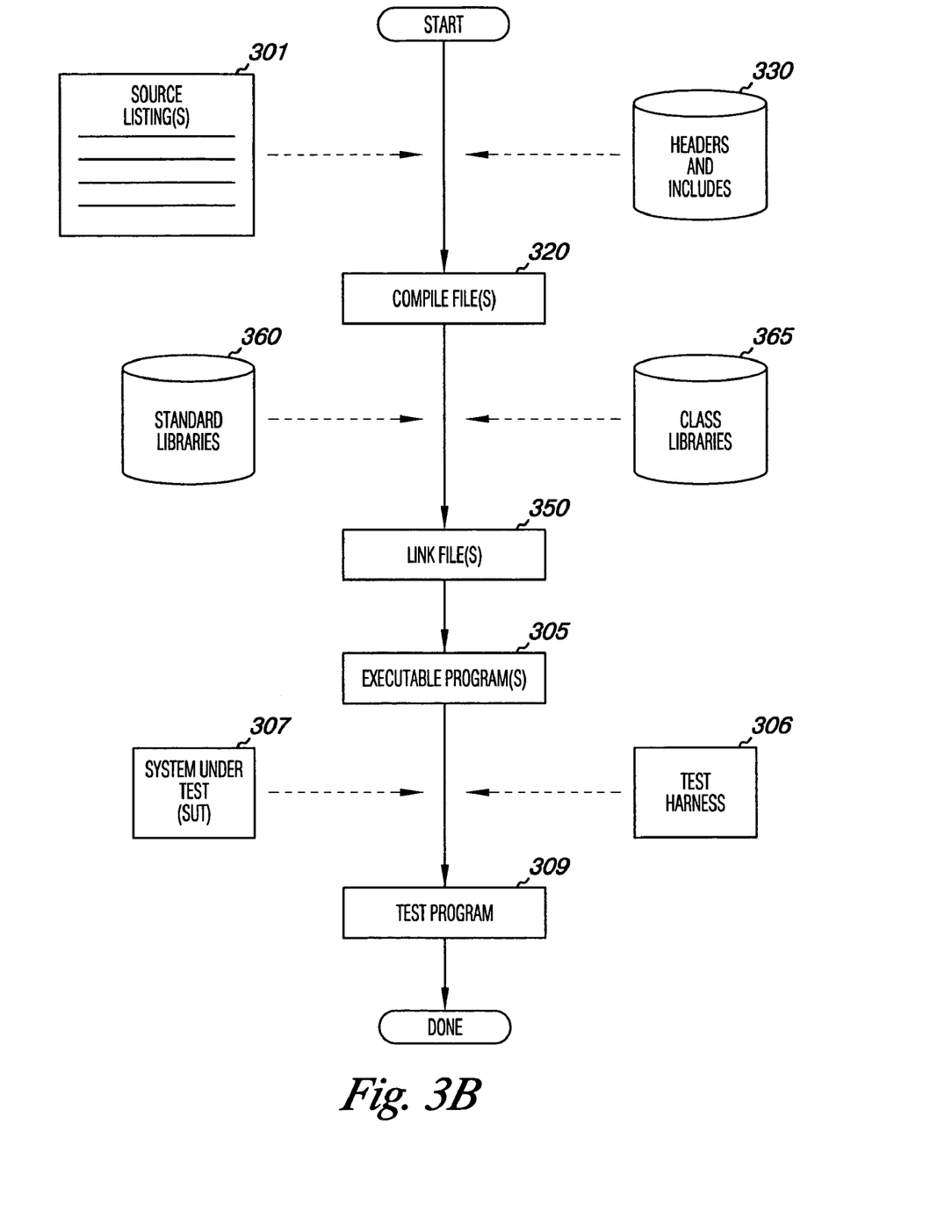
FIG. 3B is a flowchart illustrating an operation embodiment to the development system shown in FIG. 3A.

FIG. 3A is a block diagram illustrating in more detail of an embodiment of the software development system shown in FIG. 2. FIG. 3B is a flowchart illustrating an operation embodiment to the development system shown in FIG. 3A. One type of popular programming uses object technology. Object technology is a methodology for designing and programming information systems. In object technology, which is implemented using object-oriented programming tools, information systems are designed as building blocks that contain both the data and the processing (the "attributes" and the "methods").

C++ and Java are examples of object oriented programming languages, although other high level programming languages, e.g., COBOL are still used in programming. FIGS. 3A and 3B are discussed in relation to object oriented programming languages. Embodiments of the invention, however, are not limited to implementation with object oriented programming.

Object oriented programming is programming that supports object technology. It is an evolutionary form of modular programming with more formal rules that allow pieces of software to be reused and interchanged between programs. Major concepts are encapsulation, inheritance and polymorphism. Encapsulation is the creation of self-sufficient modules that contain the data and the processing (data structure and functions that manipulate that data). These user-defined, or abstract, data types are called "classes." One instance of a class is called an "object." For example, in a payroll system, a class could be defined as Manager, and Pat and Jan, the actual objects, are instances of that class. Classes are created in hierarchies, and inheritance allows the knowledge in one class to be passed down the hierarchy. That means less programming is required when adding functions to complex systems. If a step is added at the bottom of a hierarchy, then only the processing and data associated with that unique step needs to be added. Everything else about that step is inherited.

Object oriented programming allows procedures about objects to be created whose exact type is not known until runtime. For example, a screen cursor may change its shape from an arrow to a line depending on the program mode. The routine to move the cursor on screen in response to mouse movement would be written for "cursor," and polymorphism, meaning many shapes, would allow that cursor to be whatever shape is required at runtime. In object technology, polymorphism refers to the ability of a generalized request (message) to produce different results based on the object that it is sent to. Polymorphism also allows a new shape to be easily integrated into the program.

As shown in the embodiment of FIG. 3A, the software development system 300, shown as 200 in FIG. 2, includes software (e.g., computer executable instructions) for a compiler 320, a linker 350, and an interface 310. In the embodiment of FIG. 3A interface 310, through which a user or software developer supplies source listings 301 to the compiler 320, includes both command-line driven 313 and Integrated Development Environment (IDE) 311 interfaces. The former accepts user instructions through command-line parameters. The latter provides menuing equivalents thereof. As one of ordinary skill in the art will appreciate, the IDE can be provided as a GUI interface including a main menu, a toolbar, a client area (for editing source listings), and a status line. The same are not shown so as not to obscure embodiments of the present invention.

Referring to FIGS. 3A and 3B, from the source code 301 and header and includes files 330, as the same are known and understood by one of ordinary skill in the art, the compiler 320 "compiles" or generates object modules or files 303. For general background on the construction and operation of compilers, reference is made to Fischer et al., Crafting a Compiler with C, Benjamin/Cummings Publishing Company, Inc., 1991.

As shown, the compilation process may include debugging and browsing information; specifically, explicit references to the symbols of the source listings (e.g., line numbers) are stored in the object modules 303. As shown in the embodiment of FIG. 3A, this information is referenced by a browser 380 (e.g., through the interface 310). Upon successful creation of object (.obj) files, a linker 350 next "links" or combines the object files 303 with standard libraries 360 (e.g., graphics, I/O routines, startup code, and the like) to generate executable program(s) 305, which may be executed by a target processor (e.g., processor 114 of FIG. 1). In addition to standard libraries, development system 300 can provide class libraries 365, C++ libraries which simplify windows development (as described in further detail below). As shown in FIG. 3A, a debugging module 370 may be added, as desired, for eliminating errors in the program listings 301.

As shown in FIGS. 3A and 3B, embodiments of the present invention include connecting executable program(s) 305 to a test harness 306, e.g., test controller 306 shown in FIG. 3A, and a system under test (SUT) 307 in order to test program(s) 309. According to embodiments of the present invention the test controller 306 can be part of a test harness, a test ring, a test service station in a network test center, etc., e.g., including hardware such as a computing device test controller 306 having software testing programs installed thereon, connected via network, e.g., network 118 shown in FIG. 1, to the system under test (SUT) 307. As explained in connection with FIG. 1, the SUT 307 can include the computer system 110 illustrated in FIG. 1 having a particular software workload and hardware resource implementation and/or include multiple machines, e.g., computer systems executing various program routines according to a particular software workload and hardware resource implementation running simultaneously or otherwise as the same will be known and understood by one of ordinary skill in the art.

As identified in the Background, programming software code can prove difficult due to the event-driven model and the voluminous code involved to make various functions to occur. Object oriented programming can assist to reduce these complexities. However, object oriented programming as well as other programming tools and environments can involve many different groups of programmers working on different portions of software code at different points in time.

According to embodiments described herein, program instructions execute in conjunction with the test controller 306 to register assertions which fail in association with program(s) 305 executing on the SUT 307. In various embodiments as the program instructions execute to register assertions which fail the program instructions execute to create an assertion failure record 311. As will be apparent to one of ordinary skill in the art upon reading this disclosure, embodiments can include program instructions which execute to register assertions which fail as part of the compiling process in compiler 320 and execute to create an assertion failure record 311 associated therewith as well. Registering assertions which fail as part of the compiling process in compiler 320 and creating an assertion failure record 311 therefrom is illustrated in the embodiment of FIG. 3A.

The program instructions, in conjunction with the test controller 306, further execute to identify a type and/or kind of assertion which failed and execute to correlate the assertions which fail with the type and/kind of assertion in the software code in association with program(s) 305 executing on the SUT 307, and/or undergoing the compiling process in compiler 320, as part of creating the assertion failure record(s) 311. The programs embodiments can execute to analyze assertions which fail against a set of rules to determine a kind of assertion which repeatedly fails. One of ordinary skill in the art will appreciate upon reading this disclosure the manner in which a set of rules and/or questions can be implemented as computer executable instructions to analyze and identify failed assertions by a type and/or kind of assertion in the software code in association with program(s) 305 executing on the SUT 307, and/or undergoing the compiling process in compiler 320. As one of ordinary skill in the art will appreciate the type and/or kind of assertions can include, but are not limited to, assertions selected from the group of null pointer assertions, locking assertions, and object state assertions as the same will be known and understood by one of ordinary skill in the art. In this manner the program instructions execute to correlate the failed assertions by a type and/or kind of assertion in the software code under test.

The program instructions execute to score the assertions, shown in the embodiment of FIG. 3A as assertion scorer 313, that fail based on frequency of occurrence and/or by the correlated type of assertion. The assertion scorer 313 can be implemented as computer executable instructions, e.g., firmware and/or software, in the form of an application module as part of a test harness, a test ring, a test service station in a network test center, etc. As mentioned above, the program instructions execute to collect a history of assertions, e.g., assertion failure history 315, which fail in association with the type of assertion in the software code under test. The assertion failure history 315 can similarly be implemented as computer executable instructions, e.g., firmware and/or software, in the form of an application module as part of a test harness, a test ring, a test service station in a network test center, integrated with a debugger 370, etc. Thus, according to various embodiments, the program instructions execute to correlate failed assertions with particular types of assertions in software code in association with program(s) 305 executing on the SUT 307, executing under the control of the debugger 370, and/or undergoing the compiling process in compiler 320. According to various embodiments, the assertion failure record(s) 311 can be collected first as part of the assertion failure history 315 and then scored according to the assertion scorer 313. Embodiments of the invention are not limited to the example provided in FIG. 3A.

Further, in various embodiments, the program instructions can execute to generate an assertion report 317 from the assertion scorer 313, the assertion failure history 315, the assertion failure record(s) 311 as part of a test harness, a test ring, a test service station in a network test center, etc. The program instructions can execute to execute to transmit such an assertion report 317 to a developer of the software code for purposes of reusing assertions which repeatedly fail, e.g., assertions which are routinely effective in indicating issues in the software code undergoing testing, serving to catch glitches, bugs, or invalid states of execution in a program in the coding process. Additionally, such systematic feedback can serve as a basis or reference point for the software developer to write improved assertions.

According to various embodiments, a browser 380 can be provided for exploring the objects in a program, including registering assertions which fail in association with software code executing on a computing device. In this manner, a user can browse through object hierarchies, units, and all the procedures, functions, variables, types, constants, and other symbols his or her program uses.

According to various embodiments, an integrated development environment, as the same is known and understood, can take the assertion report 317 or other output of the assertion scorer 313 and present the information to a software developer/programmer through the browser 380. For example, when a programmer examines the source code for an object in a program, assertion statements can be color coded base upon their score.

Figure 4:
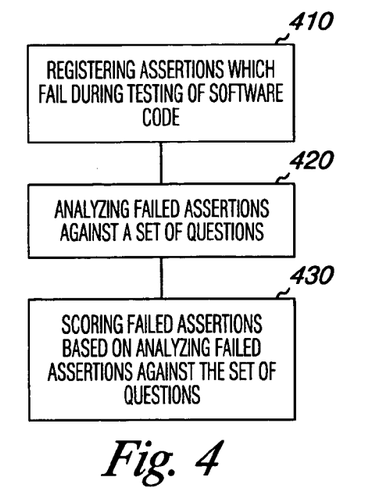
FIGS. 4-6 illustrates various method embodiments for testing software.
Figure 5:
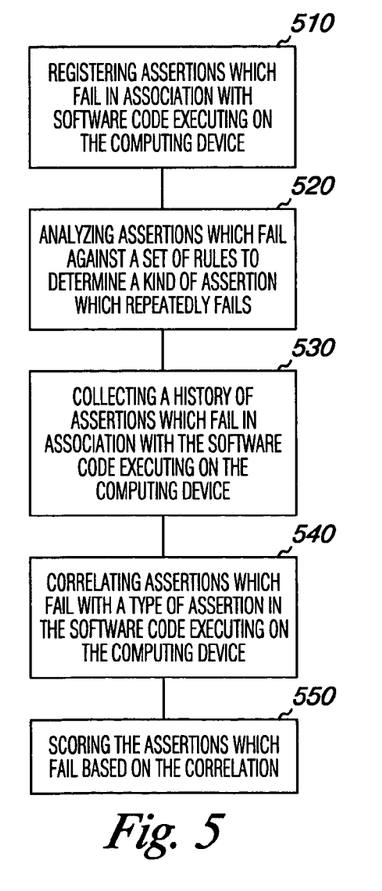
Figure 6:
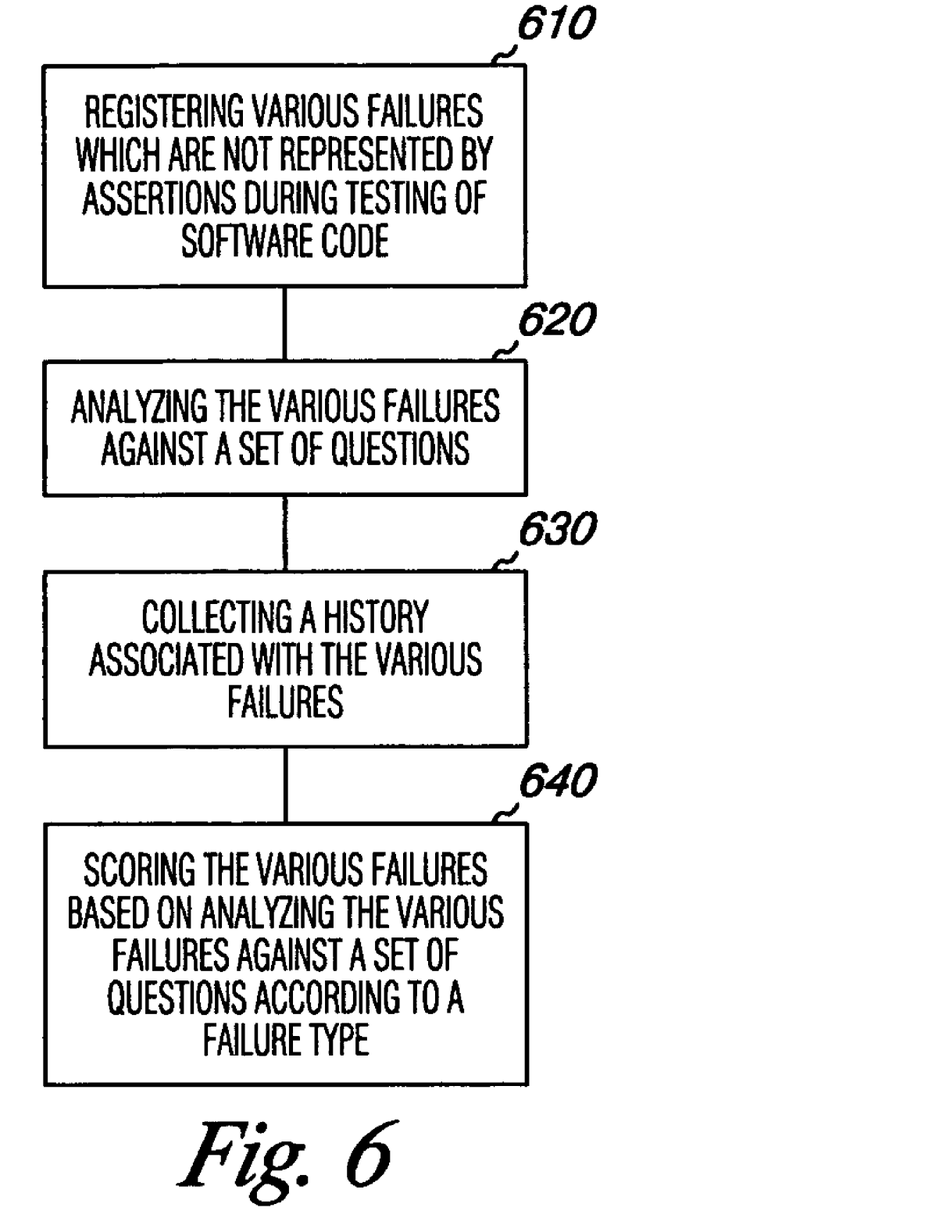

FIGS. 4-6 illustrates various method embodiments for testing software code and scoring failed assertions. As one of ordinary skill in the art will understand, the embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

FIG. 4 illustrates a method embodiment testing software. In the embodiment of FIG. 4, the method includes registering assertions which fail during testing of software code as shown at block 410. As described above in connection with FIGS. 1-3B, program instructions are executed as part of a software development system to register the assertions that fail during testing of the software code. In various embodiments, the program embodiments execute instructions in connection with program(s) executing on a SUT, and/or undergoing a compiling process in compiler. That is the program instructions may be executed during a program test after compiling the software code and/or the program instructions can execute to register failed assertions during the compilation process. Various embodiments can include registering assertions which fail as received from a compiler, a debugger, a test controller, and/or an integrated development environment (IDE), among other hardware and/or software/firmware components. Embodiments of the invention are not limited to these examples.

In block 420, the method includes analyzing failed assertions against a set of questions, e.g., questions and/or rules applied in the form of computer executable instructions. One of ordinary skill in the art will appreciate upon reading this disclosure the manner in which a set of rules and/or questions can be implemented as computer executable instructions. According to the various embodiments, program instructions are provided which execute to identify failed assertions by a type and/or kind of assertion in connection with program(s) executing on a SUT, and/or undergoing a compiling process in compiler as the same has been described herein. That is, the program instructions can execute to analyze assertions which fail relative to the type of assertion in the software code. Thus, the program instructions execute to identify the occurrence and particular types of assertions in the software code which triggered the failed assertions. Examples of assertions include assertions selected from the group of null pointer assertions, locking assertions, and object state assertions as the same will be known and understood by one of ordinary skill in the art. Embodiments of the invention, however, are not limited to these examples. In various embodiments the program instructions execute to collectively analyze assertion failures across a number of systems under test, e.g., a number of different sets of software code executing under separate and/or simultaneous testing.

As shown in block 430, the method further includes scoring failed assertions based on analyzing failed assertions against the set of questions. According to the various embodiments, program instructions are provided which execute to determine a kind of assertion which repeatedly fails. The program instructions execute to assign points to each kind of assertion upon the occurrence of the failed assertion and the kind of assertion. As the program instructions execute to assign points to the assertions, the assertions which fail with a greater frequency, e.g., are particularly useful in identifying one or more errors in the software code, will score more points. As noted above, the assertions which repeatedly fail are routinely effective in indicating issues in the software code undergoing testing, serving to catch glitches, bugs, or invalid states of execution in a program in the coding process. Thus, the program instructions in executing to score failed assertions can provide a systematic feedback to identify assertions which should be in increasingly implemented in the coding process and even provide a model or reference point for the creation of improved assertions therefrom by a software developer.

FIG. 5 illustrates another method embodiment for testing software. In the embodiment of FIG. 5, the method includes registering assertions which fail in association with software code executing on a computing device as shown in block 510. The software code can be executing on a computing device such as the computer system 110 illustrated in FIG. 1 which can include a software testing device within a network computer, a mainframe, a test harness, a test ring, a test service station in a network test center, etc, or any other data processing system or user device. Such a computer system can include program embodiments, as the same have been described above, which execute to register assertions which fail in association with software code being tested thereon. As noted, the program embodiments can execute on a test station in a network test center which is connected over a network, e.g., LAN, WAN, or otherwise, to the computing device on which the software code is executing.

As shown in block 520 the method includes analyzing assertions which fail against a set of rules to determine a kind of assertion which repeatedly fails. As described in connection with FIG. 4, the set of rules can be implemented in the form of computer executable instructions. The program instructions can execute to determine a kind of assertion which repeatedly fails by instances of failed assertions in connection with a particular set of software code.

In block 530 the method includes collecting a history of assertions which fail in association with the software code executing on the computing device. The method includes executing program instructions which collect the history of assertions which fail, together with one or more particular types of assertions in software code which triggered the assertion failure, in a memory of the computing device on which the software is being executed. Likewise, the program instructions can execute to store the history of failed assertions, together with one or more particular types of assertions in software code which triggered the assertion failure, in memory on a test station in a network test center which is connected to the computing device on which the software code is executing over a network.

In block 540 the method includes correlating assertions which fail with a type of assertion in the software code executing on the computing device. To achieve the same program embodiments execute instructions to identify an occurrence and particular types of assertions in the software code which triggered the failed assertions in association with the collected history of failed assertions. That is, the program instructions execute to link the failed assertions with one or more particularly identified assertions in the software code.

In block 550 the method further includes scoring the assertions which fail based on the correlation to identified occurrences and particular types of assertions in the software code which triggered the failed assertions. As described above, program instructions execute to score the assertions which fail based on a frequency of occurrence and based on a correlation to identified types of assertions in the software code which triggered the failed assertions. In various embodiments program instructions execute to automatically generate feedback on identified types of assertions which fail, based on the scoring including information on the associated types of assertions, across different systems under test to improve application, e.g., implementation, of assertions in a coding process. Thus, the program embodiments execute to automatically generate feedback on identified types of assertions in the software code executing in an integrated development environment to improve application of assertions in the coding process.

As described in connection with FIG. 4, the assertions which repeatedly fail are routinely effective in identifying errors in the software code undergoing testing, serving to catch glitches, bugs, or invalid states of execution in a program in the coding process. In various embodiments the program instructions execute to generate a report identifying one or more types of assertions in the software code executing in the integrated development environment, including correlating a type of assertion to a failed assertion. The program instructions can further execute to transmit such a report to a developer of the software code. Thus, the program instructions in executing to score failed assertions can provide a systematic feedback to identify assertions which should be in increasingly implemented in the coding process and even provide a model or reference point for the creation of improved assertions therefrom by a software developer. These scored assertions, over the entire lifecycle of testing software code, can be used to learn what is occurring incorrectly in the coding process and use this information to correct such errors and improve the coding process going forward in continuing software development.

FIG. 6 illustrates another method embodiment for testing software. The embodiment of FIG. 6 illustrates that the program embodiments described herein can be employed to register various failures in a software development process which are not represented by failed assertions during testing of software code. That is, as shown in block 610, a method embodiment includes registering various failures which are not represented by assertions during testing of software code. For example, program embodiments can be executed on a software testing device, or as part of a software testing module, connected to a computing device, e.g., 110 in FIG. 1, on which a program is being run, e.g., running a program under a test harness or in association with a debugging module as the same are known and understood by one of ordinary skill in the art. In such scenarios a program can still fail and a debugging program, e.g., debugger module shown in FIG. 3A, can still detect errors, e.g., bugs in the software, even if no assertions are triggered and/or present in the software code.

As shown in block 620, program embodiments are implemented as part of the test harness or debugging module to analyze the various failures against a set of questions. As with the above embodiments, the set of questions can be implemented as a set of computer executable instructions. In these embodiments the program instructions execute to examine a type of failure, e.g., to learn a source state of a given failure as the same will be known and understood by one of ordinary skill in the art. In various embodiments the various failures can be registered by executing program instructions as part of a core dump routine on a computing device as the same will be known and understood by one of ordinary skill in the art. The program instructions in these embodiments can execute to compare and analyze the data in such a core dump against known or expected results as part of the analysis.

In the embodiment of FIG. 6 the method further includes collecting a history associated with the various failures as shown in block 630. In a similar manner to that described in connection with FIG. 5, the program instructions can execute to collect a history associated with various failures, including analysis information from block 620, and save this information in memory.

And, as shown in block 640 the method can include scoring the various failures, based on analyzing the various failures against the set of questions, according to a failure type and/or occurrence frequency, e.g., based on the analysis and collected history described above. That is, analogous to FIGS. 4 and 5 program embodiments can execute to score various software code failures, which are not connected with assertions, based on a frequency of occurrence and based on a correlation to particular identified types of failures, resulting from the analysis and history information, in the software code which triggered various instances of failure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A software testing device, comprising:
   a processor;
   a memory coupled to the processor; and
   program instructions provided to the memory and executable by the processor to:
   register assertions which fail during testing of software code;
   collecting a history of assertions which fail;
   analyze assertions which fail against a set of rules to correlate an instance of a failed assertion with a type of assertion and to identify a frequency of occurrence in association with the type for each failed assertion; and
   score assertions by assigning points to the assertions which fail based on the frequency of occurrence and the type.

2. The device of claim 1, wherein the assertions include assertions selected from the group of:
   null pointer assertions;
   locking assertions; and
   object state assertions.

3. The device of claim 1, further including program instructions that execute to register assertions which fail as received from hardware and software components selected from the group of:
   a compiler;
   a debugger;
   a test controller; and
   an integrated development environment (IDE).

4. The device of claim 1, further including program instructions that execute to collectively analyze assertion failures across a number of systems under test.

5. The device of claim 1, further including program instructions that execute to automatically generate feedback on identified types of assertions which fail across different systems under test to improve application of assertions in a coding process.

6. The device of claim 1, wherein the device is connected to a system under test, wherein the system under test includes a computing device connected to a local area network (LAN) having software code executing thereon.

7. The device of claim 1, wherein the device is connected to a system under test, wherein the system under test includes a computing device connected to a wide area network (WAN).

8. A software testing system, comprising:
a computing device having software code executing thereon; and
a software testing device coupled to the computing device, the software testing device, comprising:
a processor;
a memory coupled to the processor; and
program instructions provided to the memory and executable by the processor to:
register assertions which fail in association with the software code executing on the computing device;
collect a history of assertions which fail in association with the software code executing on the computing device;
analyze assertions which fail against a set of rules to correlate assertions which fail with a kind of assertion which repeatedly fails; and
score assertions by assigning points to assertions which fail based on a frequency of occurrence and the kind of assertion.

9. The system of claim 8, further including program instructions that execute to correlate assertions which fail with the kind of assertion in the software code executing on the computing device.

10. The system of claim 8, further including program instructions that execute to assign points to assertions which fail in association with the software code executing on the computing device.

11. The system of claim 8, wherein the assertions include assertions selected from the group of:
null pointer assertions;
locking assertions; and
object state assertions.

12. The system of claim 8, further including program instructions that execute to register assertions which fail as received from hardware and software components selected from the group of:
a compiler;
a debugger;
a test controller; and
an integrated development environment (IDE).

13. The system of claim 8, further including program instructions that execute to collectively analyze assertion failures in association with software code executing on a number of computing devices connected to the software testing device.

14. The system of claim 13, further including program instructions that execute to:
collect a history of assertions which fail in association with the software code executing on the number of computing devices connected to the software testing device; and
correlate assertion failures according to one or more types of assertions in the software code executing on the number of computing devices connected to the software testing device.

15. The system of claim 8, further including program instructions that execute to automatically generate feedback on identified types of assertions which failed in the software code executing in an integrated development environment to improve application of assertions in a coding process.

16. The system of claim 15, further including program instructions that execute to generate a report identifying one or more failed assertions by instance of failed assertion type.

17. The system of claim 16, further including program instructions that execute to transmit the report, identifying one or more failed assertions by instance of failed assertion type, to a developer of the software code.

18. The system of claim 8, further including program instructions that execute to register and analyze various failures which are not represented by assertions in association with the software code executing on the computing device.

19. The system of claim 18, further including program instructions that execute to;
collect a history of the various failures which are not represented by assertions in association with the software code executing on the computing device; and
score the various failures in association with the software code executing on the computing device according to a failure type.

20. A method for software testing, comprising:
registering assertions which fail during testing of software code;
collecting a history of assertions which fail;
analyzing failed assertions against a set of questions to correlate an instance of a failed assertion with a type of assertion and to identify a frequency of occurrence in association with a type for each failed assertion; and
scoring failed assertions by assigning points to the assertions based on the frequency of occurrence in association with the type for each failed assertion.

21. The method of claim 20, wherein the method includes registering which types of assertions fail most frequently during testing of software code.

22. The method of claim 21, wherein the method includes collecting a history of assertions which fail in a system under test.

23. The method of claim 20, wherein the method includes registering assertions which fail as received from hardware and software components selected from the group of:
a compiler;
a debugger;
a test controller; and
an integrated development environment (IDE).

24. The method of claim 20, wherein the method includes registering failed assertions selected from the group of:
null pointer assertions;
locking assertions; and
object state assertions.

25. The method of claim 20, wherein the method includes analyzing assertion failures across a number of systems under test.

26. The method of claim 20, wherein the method includes:
registering various failures which are not represented by assertions during testing of software code;
analyzing the various failures against a set of questions;
collecting a history associated with the various failures; and
scoring the various failures according to a failure type based on analyzing the various failures against a set of questions.

27. A method for software testing, comprising:
registering assertions which fail in association with software code executing on the computing device;
collecting a history of assertions which fail in association with the software code executing on the computing device;
analyzing assertions which fail against a set of rules to correlate an instance of a failed assertion with a type of assertion; and
scoring assertions which fail by assigning points to the assertions based on a frequency of occurrence and the kind of assertion.

28. The method of claim 27, wherein the method includes correlating assertions which fail with a type of assertion in the software code executing on the computing device.

29. The method of claim 27, wherein the method includes collectively analyzing assertion failures in association with software code executing on a number of computing devices in a system under test.

30. The method of claim 29, wherein the method includes:
collecting a history of assertions which fail in association with the software code executing on the number of computing devices; and
correlating assertion failures according to one or more types of assertions in the software code executing on the number of computing devices.

31. The method of claim 30, wherein the method includes correlating assertion failures in an integrated development environment to improve application of assertions in a coding process.

32. The method of claim 30, wherein the method includes:
generating feedback based on correlating assertion failures according to one or more types of assertions; and
identifying one or more failed assertions by instance of failed assertion type.

33. The method of claim 30, wherein the method includes transmitting report information, identifying one or more failed assertions by instance of failed assertion type, to a developer of the software code.

34. A computer readable medium having instructions for causing a device to perform a method, comprising:
registering assertions which fail during testing of software code;
collecting a history of assertions which fail;
analyzing failed assertions against a set of questions to correlate an instance of a failed assertion with a type of assertion and to identify a frequency of occurrence in association with the type for each failed assertion; and
scoring failed assertions by assigning points to the assertions based on the frequency of occurrence in association with the type for each failed assertion.

35. The medium of claim 34, wherein the method includes registering assertions, analyzing failed assertions, scoring failed assertions, and collecting a history of assertions which fail across a number of software code tests.

36. The medium of claim 35, wherein the method includes correlating assertions which fail with one or more types of assertions in the number of software code tests.

37. The medium of claim 36, wherein the method includes transmitting report information, identifying one or more failed assertions by instance of failed assertion type, to a developer of the software code.

* * * * *

UNITED STATES PATENT AND TRADEMARK OFFICE
CERTIFICATE OF CORRECTION

PATENT NO. : 7,322,026 B2  
APPLICATION NO. : 10/792208  
DATED : January 22, 2008  
INVENTOR(S) : Manish K. Ahluwalia et al.

Page 1 of 1

It is certified that error appears in the above-identified patent and that said Letters Patent is hereby corrected as shown below:

On the Title page, in field (56), under "U.S. Patent Documents", in column 2, line 7, below "2005/0204345  A1* ....................... 717/127" insert

| | | |
|---|---|---|
| -- 5,682,310 | 10/1997 | Pedneau, et al. |
| 5,740,444 | 04/1998 | Frid-Nielsen |
| 5,805,894 | 09/1998 | Robison |
| 6,044,217 | 03/2000 | Brealey, et al. |
| 6,536,035 | 03/2003 | Hawkins |
| 6,591,402 | 07/2003 | Chandra, et al. |
| 6,609,246 | 08/2003 | Guhr, et al. |
| 6,658,598 | 12/2003 | Sullivan --, therefor. |

Signed and Sealed this

Twenty-second Day of July, 2008

JON W. DUDAS  
*Director of the United States Patent and Trademark Office*